July 12, 1960  T. M. PETTEY, JR  2,944,564
PRESSURE RELIEF VALVE WITH REMOTE CALIBRATION CHANGE
Filed May 29, 1959
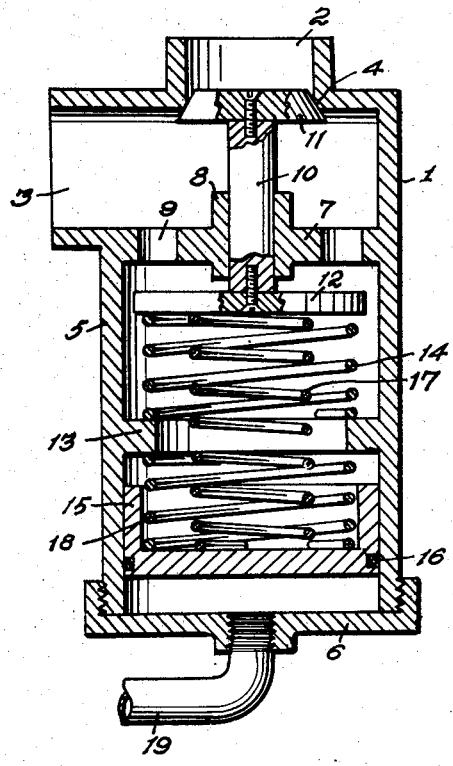
INVENTOR.
Thomas M. Pettey, Jr.
BY
S. J. Rotondi, & A. J. Dupont

United States Patent Office 2,944,564
Patented July 12, 1960

2,944,564

PRESSURE RELIEF VALVE WITH REMOTE CALIBRATION CHANGE

Thomas M. Pettey, Jr., Wayne, Pa., assignor to the United States of America as represented by the Secretary of the Army Filed May 29, 1959, Ser. No. 817,013

1 Claim. (Cl. 137—529)

This invention relates to pressure relief valve and more specifically to a pressure relief valve which can be remotely controlled so as to operate at either of two preselected pressures.

In fluid pressure systems such as, for example, fuel feed or fluid power plant systems it is necessary to operate at different pressures under different operating conditions. In such cases where the system is to be provided with a pressure relief valve it is necessary to provide a valve which may be adjusted to operate properly under the different pressure conditions.

The valve of the present invention may be selectively set from a remote point so as to open at either of two preselected pressures. The valve is provided with a pair of springs. The bias of one of the springs is effective to hold the valve closed until the lower predetermined pressure has been reached. The valve body is provided with a fluid pressure actuated piston which may be operated at will to activate the second spring so as to resist valve opening. In this case both springs oppose valve opening and the valve will open only after the higher predetermined pressure has been reached.

It is an object of this invention to provide a pressure relief valve which will open at either of two predetermined pressures.

It is another object of the invention to provide a relief valve having a pair of springs to oppose valve opening.

Yet another object of the invention is to provide a variable relief valve which may be controlled from a remote point.

Still another object of the invention is to provide a relief valve having two springs, one of which opposes valve opening at a low pressure and both of which oppose valve opening at a higher pressure.

Another object of the invention is to provide a relief valve having a biasing spring which is activated by a pressure operated piston.

These and other objects will become more apparent when reference is had to the following detailed description and drawing in which:

The figure shows an axial sectional view of the valve of this invention.

Referring to the drawing the valve body is indicated by reference character 1 and is provided with inlet passage 2 and outlet passage 3. The inlet passage 2 is bevelled off at 4 to form a valve seat. Formed integrally with the body 1 is the cylindrical housing portion 5 having the pressure tight end cap 6 secured thereto. The wall 7 separates the housing 5 and outlet passage 3 and is provided with the central bearing portion 8 and apertures 9. Slidably received in the bearing 8 is the valve stem 10 carrying at one end the valve head 11 and at the other end the plate 12.

The housing 5 is provided with an intermediate integral stop member 13 and the coil spring 14 is disposed between the stop and plate 12 to urge the valve in a closing direction. The lower end of housing 5 slidably receives the piston 15 which is sealed with respect thereto by O-ring seal 16. The coil spring 17 is disposed between the piston 15 and plate 12 and received within the spring 14. The spring 18 is disposed between the piston 15 and stop 13 to urge the piston downwardly. Fluid pressure may be admitted through the conduit 19 to the under side of the piston 15 to urge the piston upwardly.

In operation the valve may be set to open at either of two distinct pressures in the inlet 2. These pressures may be predetermined by proper selection of the strengths of springs 14 and 17. When the valve is to open at the lower selected pressure no fluid pressure is applied to line 19 and the spring 18 forces the piston 15 downwardly to relieve any compression in the spring 17 when the valve is closed. Thus, the amount of pressure on the valve head 11 required to lift the valve head off the seat is only that necessary to compress the spring 14 and cause slight compression of the unstressed spring 17.

When it is desired to have the valve open at the higher pressure, fluid pressure is admitted through line 19 to the underside of piston 15 to move the piston into engagement with stop 13. This compresses the spring 17 so that the force necessary to open the valve is that required to compress the spring 14 and stressed spring 17. As previously pointed out the pressures at which the valve opens are determined by proper selection of the valves of springs 14 and 17.

Thus, it will be seen that I have provided a relief valve that will operate at either of two preselected pressures and which may be controlled to operate at either of the pressures from a remote point.

While I have shown and described but one illustrative embodiment of my invention, it will be obvious that changes in construction and arrangement may be made without departing from the scope of my invention as defined in the subjoined claim.

I claim:

A pressure relief valve comprising a body having an inlet and outlet, a housing attached to said body, a valve member carried by said body movable toward and away from said inlet, said valve member extending into said housing, a stop in said housing intermediate the ends thereof, first spring means disposed between said stop and valve member, a piston slidable between said stop and the end of said housing remote from said valve member, means to admit pressure fluid to said housing to urge said piston toward said valve member, second spring means disposed between said piston and valve member, said first and second spring means urging said valve member toward said inlet and third spring means disposed between said stop and piston to urge said piston away from said valve member.

References Cited in the file of this patent

UNITED STATES PATENTS

| | | |
|---|---|---|
| 1,519,856 | Lorraine | Dec. 16, 1924 |
| 1,623,431 | McVoy | Apr. 5, 1927 |
| 2,079,135 | Turner | May 4, 1937 |
| 2,770,255 | Goddard | Nov. 13, 1956 |